R. L. KING, Jr., AND B. L. KING.
AUXILIARY BRACE FOR AUTOMOBILES.
APPLICATION FILED MAY 12, 1919.

1,320,695.

Patented Nov. 4, 1919.

INVENTOR.
Ross L. King Jr.
Bruce L. King.

BY

Harry D. Wallace

ATTORNEY.

UNITED STATES PATENT OFFICE.

ROSS L. KING, JR., AND BRUCE L. KING, OF SYRACUSE, NEW YORK.

AUXILIARY BRACE FOR AUTOMOBILES.

1,320,695.                    Specification of Letters Patent.    Patented Nov. 4, 1919.

Application filed May 12, 1919. Serial No. 296,346.

*To all whom it may concern:*

Be it known that we, Ross L. KING, Jr., and BRUCE L. KING, citizens of the United States, residing at Syracuse, in the county of Onondaga and State of New York, have invented certain new and useful Improvements in Auxiliary Braces for Automobiles, of which the following is a specification.

This invention relates to auxiliary braces for the front axles of automobiles, and has for its object to provide a novel, simple, effective and inexpensive brace designed to coöperate with and to reinforce certain types or radius rods which are employed for bracing and holding the front axles of motor vehicles in proper alinement for steering purposes. A further object is to provide auxiliary radius braces of the class, which may be applied by unskilled persons without the use of any special tools, and which are so constructed and arranged that they may be employed as gages for straightening and truing-up the present radius rods, where the latter are found to be bent or otherwise distorted and unfit for properly supporting the axles of the vehicles.

We attain these objects by means set forth in the detailed description which follows, and as illustrated by the accompanying drawings, in which—

Figure 1:
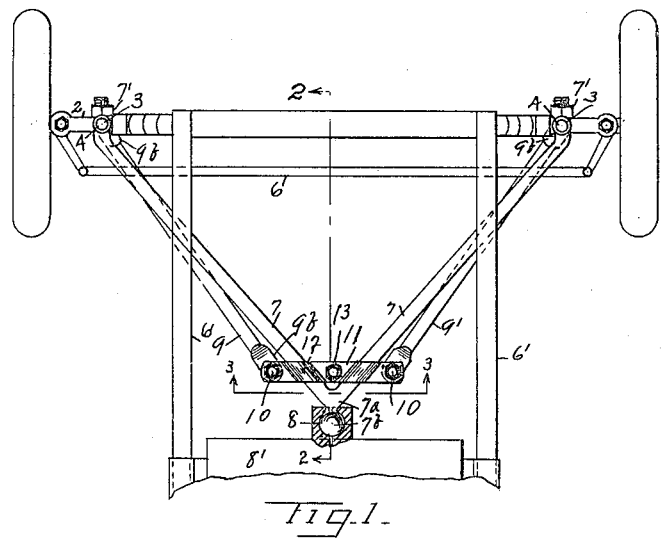
Figure 1 is a broken top-plan view of the chassis and running-gear of an automobile; showing the radius rods and our auxiliary braces attached thereto.

In the drawing, 2 represents the front axle of a motor vehicle, 3—3 are the spring perches, held rigidly on the axle by bolts 4, which are secured by nuts 5. 6 is the usual tie-rod, which parallels the axle 2, and 6' is the chassis. 7—7 are the radius rods, which form parts of a well-known automobile structure, and these are arranged in the shape of a V, in which the two arms diverge toward and pass through the spring perches 3, where they are held in place by nuts 7'. The rear ends of the radius rods form the apex of the V, and beyond the apex is an integral ball $7^b$, which is received in a spherical socket 8 of the crank-case 8' of the engine. The radius rods 7 are employed for holding the front axle in substantially vertical position, so as to permit of the proper steering of the vehicle. The radius rods, as at present constructed, are incapable of bracing and holding the front axles in proper alinement, without the aid of some auxiliary means for reinforcing and strengthening said rods, for successfully resisting the violent jars incident to the operation of the vehicle, and yet hold the front axle in proper position.

Figure 2:
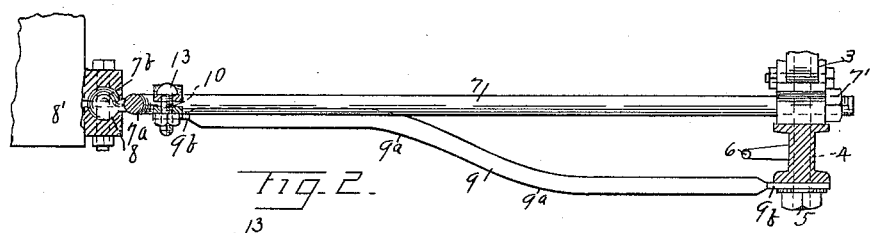
Fig. 2 is an enlarged central longitudinal section, taken on line 2—2 of Fig. 1.
Figure 3:
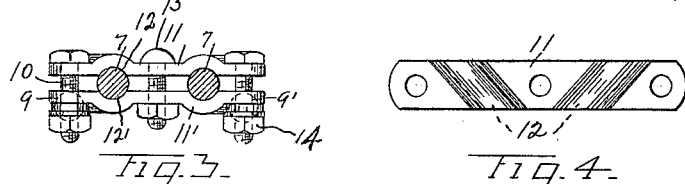
Fig. 3 is an enlarged vertical cross-section, taken on line 3—3 of Fig. 1.
Figure 4:
Fig. 4 is a view of one of the clamping members.
Figure 5:
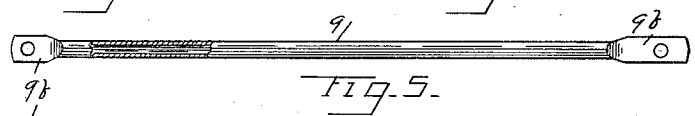
Fig. 5 is a top side view of one of the auxiliary braces, a portion being broken away to show its tubular nature.
Figure 6:
Fig. 6 is a side view of the same.
Figure 7:
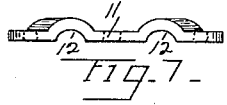
Fig. 7 is an edge view of one of the clamps.

A detailed description of our invention follows:

Our auxiliary braces consist of a pair of similar tubular rods 9 and 9', which are provided intermediate their ends with similar compound bends $9^a$, for strengthening said rods, as well as for facilitating their installation without the use of special tools for the employment of skilled labor. The opposite ends of the auxiliary rods 9 and 9' are flattened, by heating and crushing the tubes, as at $9^b$, and the corresponding ends are perforated to receive the bolts 4; while the opposite ends are similarly perforated, to receive bolts 10, that pierce the opposite ends of a pair of clamping members 11 and 11', which are mounted on the top and bottom sides of the radius rods 7, a short distance forwardly of the apex $7^a$. The clamps 11 and 11' are each provided with similar corrugations or grooves 12 and 12', which are disposed at the same angles to, and partially receive the diverging arms of the radius rods 7. The grooves 12 and 12' are intended to snugly fit the rods 7, and they are of such depth that when the clamps are placed in position, as shown in Figs. 1, 2 and 3, there is a clear space between the inner sides of said clamps, which permits the clamps to be drawn tightly against the rods 7, without interference from each other. The rear ends of the braces 9 and 9' are preferably disposed beneath the lowermost clamp member, and they are held in place by nuts 14. By this disposition and arrangement of the rear ends of the braces they may be readily applied without interference from the rods 7, and when the bolts 10, and also a third bolt 13 which passes through the middle portion of the clamps, are tightened up, it is impossible for the clamps to be shifted or moved either forwardly or backwardly by the violent jars imparted to them while the vehicle is in motion. Furthermore, by corrugating the clamping members 11 and 11', the said members may only be disposed in a certain position relatively to the apex 7ª of the axle 2, the said distance being accurately determined by the spacing of said corrugations, so that any unskilled person may properly apply the said braces. The braces 9 and 9' are both made exactly the same length, and the perforations in their opposite ends have the same spacing, so that the braces may be applied to the particular make of car, without requiring any cutting or fitting, as long as the radius rods 7 and the front axle are in their proper condition. In cases where the original radius rods have been bent or otherwise sprung sufficiently to throw the axle out of true alinement, the braces may be employed, in the first place, as gages for straightening or truing-up the radius rods; after which the braces may be applied, as described. This is an important feature of our invention: In case an owner desires to equip his car with our auxiliary braces, he first places the clamps 11 and 11' in position, connects the braces to the bolts 10, and then tries the braces to see if their front ends will receive the bolts 4. If he is unable to attach the braces to the bolts 4, it is an indication that the radius rods have been bent or distorted, and must be straightened or corrected before he can secure the braces in their proper position. The straightening of the radius rods is usually a simple operation, and it requires but a few minutes' time to properly adjust both the radius rods and the axle, after which our auxiliary braces may be readily and quickly applied, as described. The rear ends of braces 9 and 9' are preferably disposed a greater distance apart than the corresponding portions of the radius rods to facilitate the convenient and ready application of the auxiliary parts. Furthermore, by spreading the rear ends of the braces as described, they are not so liable to buckle or yield laterally, when the vehicle strikes ruts or bumps, because the line of resistance or strain is more direct and straight than if the braces were disposed closer together.

Having thus described our invention, what we claim, is—

1. In auxiliary braces for automobiles, the combination with the front axle and the diverging radius rods, of a pair of corrugated clamping members mounted on said rods near the apex thereof and spaced from each other, bolts piercing the ends of said members, a pair of braces having corresponding compound-bends intermediate their ends, and having their rear-ends perforated to receive said bolts, the opposite ends of said braces being perforated to receive bolts carried by said axle, and said braces passing beneath said rods and spaced a greater distance apart at their rear ends than the rear portion of said rods.

2. In auxiliary braces for automobiles, the combination with the front axle, the spring-perches and the diverging radius rods, of a pair of similar tubular braces, having their forward ends perforated to receive bolts which hold said spring-perches in place, the rear-ends of said braces also being perforated, a pair of corrugated clamping members mounted on the top and bottom sides of said radius rods a measured distance from the rear ends of said rods, and bolts passing through said clamping members and through the rear-ends of said braces for holding all of said parts rigidly in place.

3. In auxiliary braces for automobiles, the combination with the front axle, the diverging radius rods and the spring-perches, the latter being bolted to the axle, of a pair of similar clamping members having angular corrugations adapted to partially receive the rear end portions of said radius rods, bolts piercing the ends and the middle of said clamping members, adapted to clamp said members to said rods in a manner to leave a clear space between the members, tubular braces having corresponding compound bends intermediate their ends and having their opposite ends perforated to receive the end bolts of the clamping members as well as the bolts which secure the spring-perches, the said braces spaced a greater distance apart at their rear-ends than said rods and disposed beneath the clamping members for increasing the strength of said rods and said braces and also for faciltating the installation of the latter.

In testimony whereof we affix our signatures.

ROSS L. KING, Jr.
BRUCE L. KING.

Copies of this patent may be obtained for five cents each, by addressing the "Commissioner of Patents, Washington, D. C."